United States Patent [19]

Sasaki et al.

[11] Patent Number: 5,132,371

[45] Date of Patent: Jul. 21, 1992

[54] METHACRYLIMIDE-CONTAINING POLYMER AND THERMOPLASTIC RESIN COMPOSITION COMPRISING THIS POLYMER

[75] Inventors: Isao Sasaki, Otake; Kozi Nishida, Toyama; Masaharu Fujimoto, Otake, all of Japan

[73] Assignee: Mitsubishi Rayon Company Ltd., Tokyo, Japan

[21] Appl. No.: 448,288

[22] Filed: Dec. 11, 1989

[30] Foreign Application Priority Data

Dec. 13, 1988 [JP] Japan .................. 63-312794

[51] Int. Cl.$^5$ .................. C08F 265/04; C08F 283/04
[52] U.S. Cl. .................. 525/301; 525/298; 525/309; 525/317; 525/276; 525/285; 525/302; 525/313; 525/322; 525/324; 525/282
[58] Field of Search ............ 525/298, 309, 317, 330.5, 525/384, 301

[56] References Cited

U.S. PATENT DOCUMENTS

| | | | |
|---|---|---|---|
| 3,284,425 | 11/1966 | Schroder et al. | 525/378 |
| 4,595,727 | 6/1986 | Doak | 525/75 |
| 4,727,117 | 2/1988 | Hallden-Abbenton | 525/327.4 |

FOREIGN PATENT DOCUMENTS 0216505  4/1987  European Pat. Off. .
1242369  6/1967  Fed. Rep. of Germany .

*Primary Examiner*—James J. Seidleck
*Assistant Examiner*—Vasu S. Jagannathan
*Attorney, Agent, or Firm*—Oblon, Spivak, McClelland, Maier & Neustadt

[57] ABSTRACT

A methacrylimide-containing polymer comprising a polymer (A) comprised of 5-100 weight % of units represented by the formula (I):

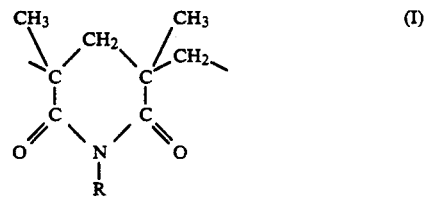

wherein R is H or C1-20 hydrocarbon group, and 0-95 weight % of units derived from an ethylenic monomer, wherein a polymer derived from at least one ethylenic monomer has been grafted onto the polymer (A). The methacrylimide-containing polymer is used as a blend with another thermoplastic polymer.

2 Claims, No Drawings

METHACRYLIMIDE-CONTAINING POLYMER AND THERMOPLASTIC RESIN COMPOSITION COMPRISING THIS POLYMER

BACKGROUND OF THE INVENTION

1. Field of the Invention

This invention relates to an improvement of the properties of a polymer containing methacrylimide ring structures (hereinafter referred to as "methacrylimide-containing polymer") having an excellent transparency and heat resistance, and to a blend of this polymer with another thermoplastic polymer.

2. Description of the Related Art

Since a methyl methacrylate polymer has not only an excellent transparency but also satisfactory weatherability and mechanical properties, this polymer is used as a high-performance plastic optical material or a decorative material. Recently, the use of this polymer in the fields of short-distance optical communication and optical sensors has been investigated, but since the heat distortion temperature of the methyl methacrylate polymer is as low as about 100° C, the polymer cannot be satisfactorily applied to fields where a heat resistance is required, and thus an enhancement of the heat resistance is urgently required.

The imidization of a methyl methacrylate polymer is known as a means for improving the heat resistance of this polymer. For example, there have been proposed (1) a process comprising reacting under heating a polymer of acrylic acid, methacrylic acid or an ester thereof with a primary amine, ammonia or a compound capable of generating a primary amine or ammonia in the presence of a solvent (see U.S. Pat. No. 2,146,209, German Patent No. 1,077,872 and German Patent No. 1,242,369), (2) a process comprising reacting a methyl methacrylate polymer with a primary amine in the presence of water (see U.S. Pat. No. 3,284,425), and (3) a process comprising reacting an acrylic polymer with ammonia or a primary amine in an extruder (see U.S. Pat. No. 4,267,374).

The methacrylimide-containing polymers prepared according to these processes, however, have no compatibility or miscibility with many other thermoplastic polymers and thus, when these polymers are blended with other thermoplastic polymers and molded, uniform blends cannot be obtained and the characteristics of the respective polymers cannot be property exerted.

European Patent Publication No. 0216505 proposes that, to improve the compatibility or miscibility of a methacrylimide-containing polymer with other thermoplastic polymers, the amounts of acid and acid anhydride functional groups slightly present on the methacrylimide-containing polymer should be reduced.

In a blend of the methacrylimide-containing polymer obtained according to this proposal with another thermoplastic polymer, however, a substantial improvement of the compatibility and miscibility is not observed, or if an improvement is observed, such an improvement is very slight.

SUMMARY OF THE INVENTION

A primary object of the present invention is to overcome the above-mentioned defects of the conventional techniques and provide a methacrylimide-containing polymer having an excellent compatibility or miscibility with other thermoplastic polymers.

Another object of the present invention is to provide a thermoplastic resin composition retaining an excellent heat resistance, weatherability, mechanical properties and moldability inherently possessed by a methacrylimide-containing polymer, and further, having the characteristics of another polymer.

The present inventors researched and investigated ways in which to improve the compatibility or miscibility of a methacrylimide-containing polymer with other thermoplastic polymers, and as a result, found that this object can be attained by a thermoplastic methacrylimide-containing polymer comprising a polymer comprising at least 5% by weight of methacrylimide ring structural units, onto which at least one ethylenic monomer is grafted.

In accordance with the present invention, there is provided a methacrylimide-containing polymer which is produced by graft-polymerizing at least one ethylenic monomer onto a polymer (A) comprised of 5 to 100% by weight of methacrylimide ring-containing structural units represented by the following formula (I):

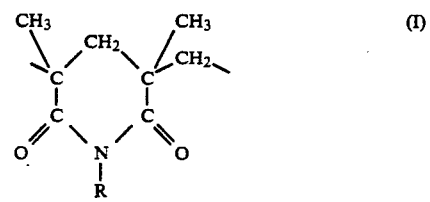

wherein R represents a hydrogen atom or an aliphatic, aromatic or, alicyclic hydrocarbon group having 1 to 20 carbon atoms, and 0 to 95% by weight of structural units derived from an ethylenic monomer.

Furthermore, in accordance with the present invention, there is provided a thermoplastic polymer composition comprising 1 to 99% by weight of the above-mentioned methacrylimide-containing polymer and 99 to 1% by weight of at least one other thermoplastic polymer.

DESCRIPTION OF THE PREFERRED EMBODIMENTS

The methacrylimide ring-containing polymer (A) can be prepared, for example, according to the following process. More specifically, a methacrylic resin is reacted with at least one compound (hereinafter referred to as "imidizing agent") represented by the following formula (II):

$$R-NH_2 \qquad (II)$$

wherein R represents a hydrogen atom or an aliphatic, aromatic or alicyclic hydrocarbon group having 1 to 20 carbon atoms, in the presence of a solvent at a temperature of at least 100° C. but lower than 350° C. in an inert gas, and a volatile substance is separated and removed from the obtained reaction product to obtain a methacrylimide-containing polymer (A) having methacrylimide ring structural units represented by general formula (I).

By the term "methacrylic resin" referred to herein, is meant a methyl methacrylate homopolymer or a copolymer comprising at least 25% by weight of units derived from methyl methacrylate and up to 75% by weight of units derived from an ethylenic monomer copolymerizable with methyl methacrylate. As the copolymerizable ethylenic monomer, there can be mentioned, for example, methacrylic acid esters (except methyl methacrylate), acrylic acid esters, methacrylic acid, acrylic acid, styrene, substituted styrenes and acrylonitrile. These ethylenic monomers can be used alone or as a mixture of two or more thereof. The methacrylic resin has an intrinsic viscosity of 0.01 to 3.0.

Solvents not inhibiting the imidization reaction of the methacrylic resin and, in a partial imidization reaction, not causing a change to methyl methacrylate and methacrylic or acrylic acid ester segments and other monomer side chains can be used for the above reaction. Aromatic hydrocarbon solvents such as benzene, toluene, xylene and ethylbenzene, and aliphatic hydrocarbon alcohols such as methanol and ethanol are preferable. A mixed solvent of an aromatic hydrocarbon solvent and an aliphatic hydrocarbon alcohol, as mentioned above, is especially preferably used.

As the imidizing agent of the general formula (II) used in the present invention, there can be mentioned ammonia, primary amines and compounds capable of generating a primary amine under heating, such as 1,3-dimethylurea, 1,3-diethylurea, 1,3-dipropylurea and urea. As the primary amine, there can be mentioned aromatic amines such as aniline, toluidine and trichloroaniline, and aliphatic amines such as methylamine, propylamine, cyclohexylamine and bornylamine. From the viewpoint of heat resistance, ammonia and methylamine are preferable.

As the inert gas to be used for the imidization reaction, there can be mentioned nitrogen gas, argon gas and helium gas. Nitrogen gas is preferable from the economical viewpoint.

The imidization degree is such that the amount of the presmethacrylimide ring structural units represented by general formula (I) in the formed polymer is at least 5% by weight. To obtain a required heat resistance, preferably the amount of the methacrylimide ring structural units is at least 20% by weight, especially at least 30% by weight. Especially, when methylamine is used of the imidizing agent, preferably the amount of the methacrylimide ring structural units is at least 50% by weight. The upper limit of the imidization degree is not particularly limited. However, in view of the moldability and the ease in graft-polymerization, the amount of the methacrylimide ring structural units is preferably up to 99% by weight, more preferably up to 95% by weight.

The methacrylimide-containing resin polymer of the present invention is obtained at subjecting at least one ethylenic monomer to polymerization in the presence of a thermoplastic polymer (B) obtained by forming grafting active sites in the polymer (A). As the method of obtaining the thermoplastic polymer (B), there can be adopted, for example, a process in which the methacrylimidering-containing polymer (A) is heated with stirring with a compound capable of giving the grafting active site in the presence or absence of a solvent.

A functional group selected from the group consisting of a methallyl group, an allyl group, a methacryloxy group, an acryloyloxy group and an epoxy group is preferable as the grafting active site. Accordingly, a compound having a methallyl group, an allyl group, a methacryloyloxy group, an acryloyloxy group or an epoxy group is preferable as the compound capable of forming a grafting active site. As specific examples, there can be mentioned compounds having a methallyl or allyl group such as methallyl or allyl alcohol; compounds having a methacryloyloxy or acryloyloxy group such as 2-hydroxyl methacrylate or acrylate and 3-hydroxyl methacrylate or acrylate; and compounds having an epoxy group such as glycidol. Among them methallyl or allyl alcohol is especially preferable.

The reaction of forming grafting active sites in the polymer (A) having methacrylimide ring structural units can be carried out in the presence or absence of a solvent. As the solvent, there can be used aromatic hydrocarbons such as benzene, toluene and xylene; glyme and diglyme solvents such as dimethoxyethane; and tetrahydrofuran, dimethylformamide, dimethylacetamide and dimethylsulfoxide. The polymer (A) and the grafting active site-forming compound are heated with stirring in a solvent as mentioned above in an autoclave. Furthermore, as the method not using a solvent, there can be adopted a method in which the reaction is carried out in the molten state by heating the methacrylimide ring structure-containing polymer in an autoclave, an extruder or a kneader. If desired, the reaction of forming the grafting active sites can be carried out in the presence of a catalyst. A catalyst showing a catalystic action to the reaction with the grafting active site-forming compound but not causing degradation of the methacrylimide ring structure-containing polymer (A) is preferably used. As specific examples of the preferable catalyst, there can be mentioned basic catalysts such as trimethylamine and triethylamine. The reaction temperature depends on the rate of reaction, but preferably the reaction temperature is at least 100° C., especially at least 200° C. The amount of the formed grafting active sites is at least 0.1% by weight, especially at least 0.5% by weight, based on the methacrylimide ring structure-containing polymer as the reactant.

The methacrylimide-containing polymer of the present invention is prepared by graft-polymerizing at least one graft-polymerizable ethylenic monomer in the presence of a thermoplastic polymer (B) obtained by forming grafting active sites in a methacrylimide ring structure-containing polymer (A) in the above-mentioned manner. As the graft-polymerizable ethylenic monomer, there can be mentioned methacrylic acid, acrylic acid, methacrylic acid esters, acrylic acid esters, epoxy-containing methacrylic acid esters, epoxy-containing acrylic acid esters, fluorine-containing methacrylic acid esters, fluorine-containing acrylic acid esters, silicon-containing methacrylic acid esters, silicon-containing acrylic acid esters; aromatic hydrocarbon vinyl monomers such as styrene, α-substituted styrenes, and benzene ring-substituted styrenes; cyano group-containing vinyl and vinylidene monomers such as methacrylonitrile and acrylonitrile; maleic acid derixatives such as maleic anhydride and N-substituted maileimides; butadiene, propylene, ethylene, vinyl acetate, isoprene; chlorine-containing vinyl and vinylidene monomers such as vinyl chloride and vinylidene chloride; fluorine-containing monomers such as vinylidene fluoride, tetrafluoroethylene, and propylene trifluoride; itaconic acid, itaconimide, citraconimide and fumaric acid diesters.

The reaction of obtaining the grafted methacrylimide-containing polymer of the present invention can be carried out in the presence or absence of a solvent. As the solvent, there can be mentioned aromatic hydrocarbons such as benzene, toluene and xylene; glymes and diglymes such as dimethoxyethane; and tetrahydrofuran, dimethylformamide, dimethylsulfoxide and dimethylacetamide. As the method not using a solvent, there can be mentioned a method in which the grafting reaction is carried out in the molten state by heating the thermoplastic polymer (B) having a grafting active site in an autoclave, an extruder or a kneader. Alternatively, there can be adopted a method in which the polymer (B) is dissolved in an graft-polymerizable ethylenic monomer or a solvent and the graft polymerization is carried out in the state of an emulsion or suspension.

A usual radical polymerization initiator can be used as the graft polymerization initiator. As the radical polymerization initiator, there can be mentioned azo type initiators and peroxide initiators. An appropriate initiator is selected according to the reaction temperature of the reaction system. For example, there can be used organic peroxides such as di-tert.-butyl peroxide, dicumyl peroxide, methyl ethyl ketone peroxide, di-tert.-butyl perbenzoate, tert.-butyl peracetate, 2,5-dimethyl-2,5-di-tert.-butylperoxy) -hexane, di-tert.-amyl peroxide, 2,5-dimethyl-2,5-di -(tert.-butylperoxy)-hexane, benzoylperoxide and lauryl peroxide; and azo type initiators such as azobisisobutanol diacetate, 1,1'-azobiscyclohexanecarbo -nitrile, 2-phenylazo-2,4-dimethyl-4-methoxyvalero -nitrile, 2-cyano-2-propylazoformamide and 2,2'-azobisisobutyronitrile. These radical polymerization initiators can be used alone or as a mixture of two or more thereof. The radical polymerization initiator is used in an amount of 0.0001 to 1% by weight based on the monomer.

The molecular weight of the grafted methacrylimide-containing polymer of the present invention can be adjusted by a radical polymerization molecular weight-adjusting agent customarily used. A mercaptan is preferably used as the molecular weight-adjusting agent. For example, there can be mentioned primary, secondary and tertiary mercaptans having an alkyl group or a substituted alkyl group, e.g., aliphatic mercaptans such as n-butylmercaptan, isobutylmercaptan, n-ocrylmercaptan, n-dodecylmercaptan, sec.-butylmercaptan, sec.-dodecylmercaptan and tert.butylmercaptan; aromatic mercaptans such as phenylmercaptan, thiocresol and 4-tert.-butyl-o-thiocresol; thioglycolic acid and esters thereof; and mercaptans having 3 to 18 carbon atoms, such as ethyleneglycol mercaptan. As the non-mercaptan molecular weight-adjusting agent, there can be mentioned β-terpinolene, terpinol and alkyl-substituted 1,4-cyclohexadienes. The amount of the molecular weight-adjusting agent used is selected within the range of 0 to 5% by weight based on the monomer.

The MI value (the measurement method will be described hereinafter) of the grafted methacrylimide-containing polymer of the present invention is 0.01 to 100, preferably 0.1 to 50.

In the grafted methacrylimide-containing polymer of the present invention, the kind of the ethylenic monomer to be grafted is determined according to the kind of the other thermoplastic polymer to be blended with the grafted polymer. For example, if the other thermoplastic polymer to be blended with the grafted polymer is an acrylonitrile/styrene copolymer, the monomer to be grafted to the methacrylimide-containing polymer is preferably a monomer mixture comprising acrylonitrile and styrene.

The grafting ratio in the grafted methacrylimide-containing polymer can be determined according to various methods. For example, the grafting ratio can be determined by dissolving in a solvent a thermoplastic polymer obtained by grafting the above-mentioned monomer mixture of acrylonitrile and styrene to the methacrylimide ring structure-containing monomer, purifying the grafted methacrylimide-containing polymer by the column chromatography using an anion exchange resin and measuring the grafting ratio of the refined polymer by the unclear magnetic resonance spectrum. The grafting ratio of the thus-obtained acrylonitrile/ styrene-grafted methacrylimide-containing polymer is preferably 0.5 to 100%. If the grafting ratio is lower than 0.5%, the compatibility with the other thermoplastic polymer at the subsequent blending step is poor and no substantial effect is attained by grafting. If the grafting ratio is higher than 100%, although the compatibility with the other thermoplastic polymer at the subsequent blending step is improved, the good heat resistance possessed inherently by the methacrylimide-containing polymer is not exerted.

The blending ratio between the grafted methacrylimide-containing polymer and the other thermoplastic polymer is in the range of from 1/99 to 99/1, preferably 10/90 to 90/10. This ratio is substantially changed according to the physical properties required for the thermoplastic resin composition formed by blending. For example, where the other thermoplastic polymer is an acrylonitrile/styrene copolymer, to obtain a thermoplastic resin composition having a high heat resistance, it is necessary to increase the amount of the acrylonitrile/styrene-grafted methacrylimide-containing polymer. In contrast, if the heat resistance is not required, the amount of the grafted methacrylimide-containing polymer can be reduced. At least one still another thermoplastic polymer can be further blended. For example, when the acrylonitrile/styrene-grafted methacrylimide-containing polymer is blended with an acrylonitrile/styrene copolymer, an ABS resin or the like can be additionally blended to improve the impact resistance.

If a further improvement of the heat resistance is desired, the starting ungrafted methacrylimide ring structure-containing polymer (A) can be further blended into the thermoplastic resin composition comprising the above-mentioned grafted methacrylimide-containing polymer and the other thermoplastic polymer.

As the thermoplastic polymer to be blended with the grafted methacrylimide-containing resin polymer, there can be mentioned, for example, a butadiene/styrene methacrylic or acrylic copolymer, a methacrylic or acrylic acid ester type multi-layer polymer, a butadiene/styrene copolymer rubber, an ethylene/propylene/-diene copolymer rubber, a polyamide, a polyamide-ABS (acrylonitrile/butadiene/styrene copolymer) blend, an ethylene/vinyl acetate copolymer, a styrene/acrylonitrile copolymer, ABS, a blend of a stylene/acrylonitrile copolymer with a methacrylic or acrylic acid ester type multi-layer polymer, a blend of a stylene/acrylonitrile copolymer with an ethylene/-propylene/diene copolymer, an α-methylstyrene/acrylonitrile copolymer, an α-methylstylene/stylene/acrylonitrile copolymer, an α-methylstyrene/acrylic acid ester copolymer, a polycarbonate, a blend of polycarbonate with ABS, a blend of polycarbonate with an ethylene/propylene/diene copolymer, a blend of polycarbonate with a methacrylic or acrylic acid ester type multi-layer polymer, polybutylene terephthalate, a blend of polybutylene terephthalate with polycarbonate, a blend of polybutylene terephthalate with ABS, a blend of polybutylene terephthalate with an ethylene/-propylene/diene copolymer, a blend of polybutylene terephthalate with polytetrahydrofuran, polyvinyl chloride, a blend of polyvinyl chloride with MBS (methyl methacrylate/butadiene/styrene copolymer), a blend of polyvinyl chloride with ABS, a blend of polyvinyl chloride with a methacrylate or acrylate polymer, chlorinated polyvinyl chloride, a blend of an acrylonitrile/methacrylate or acrylate copolymer with a methacrylic or acrylic acid ester type multi-layer copolymer, an acrylonitrile/methacrylate or acrylate/styrene copolymer, an epichlorohydrin/bisphenol A copolymer, polyethylene terephthalate and other polyalkylene terephthalates, glycol-modified polyethylene terephthalate, glycidyl-modified polyethylene terephthalate, a blend of polyethylene terephthalate with polycarbonate, polycaprolactones, a bisphenol A/isophthalic acid and/or terephthalic acid copolymer, polymethacrylates, polyacrylates, polyacetal, polystyrene, high-impact polystyrene, a styrene/maleic anhydride copolymer, a styrene/maleimide copolymer, polyolefins, polyvinylidene fluoride, a blend of polyvinilidene fluoride with a methacrylic or acrylic acid ester type multi-layer polymer, celluloses, polyethylene oxide, polyamide-imides, polyether esters, polyether-ester amides, polyether imides, polyphenylene sulfide, polyphenylene oxide, a blend of polyphenylene oxide with polystyrene, a blend of polyphenylene oxide with high-impact polystyrene, polysulfones, polyvinylidene chloride, a blend of polyvinylidene chloride with a methacrylonitrile or acrylonitrile polymer, a blend of polyvinylidene chloride with a methacrylic or acrylic acid ester blend, polyvinyl alcohol, polyvinyl acetate, polyether-ether ketones, polyether imides, and thermoplastic polyimides.

The blend of the grafted methacrylimide-containing polymer of the present invention and the other thermoplastic polymer can be modified by incorporation of glass fiber, carbon fiber or other fiber, talc or the like, or a particulate filler or reinforcer such as glass or metal particles. Furthermore, modification of the blend of the grafted methacrylimide-containing polymer and the other thermoplastic polymer can be accomplished by incorporation of additives such as a flame retardant, a blowing agent, an antioxidant, a heat stabilizer, a pigment, a delusterant, a lubricating oil, an antistatic agent, a contuctive substance, a colorant, and an ultraviolet absorber.

The present invention will now be described in detail with reference to the following referential examples, examples and comparative examples.

In these examples, all of "parts" and "%" are by weight.

In the referential examples, examples and comparative examples, the physical properties of polymers were determined by the following methods.

(1) The infrared absorption spectrum was determined by the KBr disk method using an infrared spectrometer (Model 285 supplied by Hitachi).

(2) The total luminous transmittance (%) of a molded article was measured according to the method of ASTM D-1003 using an injection-molded plate having a size of 40 mm×40 mm×3 mm as the test piece.

(3) The heat distortion temperature was measured according to the method of ASTM D-648 using a dumbbell specimen No. 1.

(4) The imidization ratio X (%) was determined by measuring the nitrogen content N (%) of the polymer by the elementary analysis using a CHN coder (Model MT-3 supplied by Yanagimoto Seisakusho) and making a calculation according to the following formula.

In the case of the following example where R in formula (I) is a methyl group:

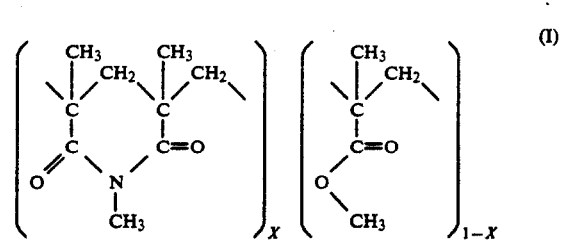

$$N(\%) = \frac{14X}{167 + (1 - X)100} \times 100$$

(5) The impact strength was measured according to the method of ASTM D-256 using a dumbbell specimen No. 1.

(6) The grafting ratio was measured in the following manner. More specifically, a grafted methacrylimide-containing polymer was dissolved in a solvent (the kind of the solvent was changed according to the kind of the grafting polymer, and for example, if methyl methacrylate was grafted, toluene was used, purification of the polymer was carried out by using a column packed with an anion exchange resin, and elution was carried out by using chloroform to obtain a methyl methacrylate-grafted methacrylimide-containing polymer. The obtained polymer was measured based on TMS in d6-DMSO solvent by using an FT-NMR spectrometer (JNM-GSX-400 supplied by JEOL), and the grafting ratio was calculated according to the following formula:

$$\text{Grafting ratio (\%)} = \frac{\text{characteristic absorption value (ester group) of methyl methacrylate polymer}}{\text{characteristic absorption value (imide ring) of methacrylimide-containing polymer}} \times 100 .$$

(7) The intrinsic viscosity of a polymer was determined in the following manner. More specifically, by using a Dereax-Bishoff viscometer, the measurement was conducted at respective polymer concentrations in chloroform as the solvent. The flow time (ts) of the chloroform solution and the flow time (to) of chloroform were measured at a temperature of 25±0.1° C., and the relative viscosity $\eta rel$ was determined at each concentration from ts/to, and the intrinsic viscosity was calculated according to the following formula:

$$\text{Intrinsic viscosity} = \lim_{C \to 0} \frac{\ln \eta^{rel}}{C}$$

wherein C represents g of the polymer in 100 ml of the solvent.

(8) The melt flowability of a polymer was evaluated based on the melt index value determined according to the method of ASTM D-1238 [the melt index (MI) value was expressed by the flow amount (g) per 10 minutes at 260° C. under a load of 10 kg].

REFERENTIAL EXAMPLE 1

Preparation of N-methylmethacrylimide-containing polymer

A reaction vessel having an inner volume of 10 liters and equipped with a paddle spiral agitator, a pressure gauge, a sample pouring vessel and a heating jacket was charged with 100 parts of a methyl methacrylate polymer [Acrypet VH (trademark) supplied by Mitsubishi Rayon; intrinsic viscosity=0.51], 90 parts of toluene and 10 parts of methanol, and the inner atmosphere of the reaction vessel was substituted with nitrogen. The temperature was elevated to 230° C. and the mixture was stirred to dissolve the polymer. Then, at 230° C., 21.7 parts (molar ratio=0.7) of methylamine in the form of a 50% solution in methanol was added into the reaction vessel from the sample pouring vessel, and a reaction was carried out for 2 hours under an inner pressure of 60 kg/cm$^2$ gauge. After termination of the reaction, the formed methacrylimide-containing polymer was reprecipitated from the solution with methanol and recovered by filtration, and the recovered polymer was dried in a drier at 110° C. under a reduced pressure to obtain a white powdery polymer. When the infrared absorption spectrum of the obtained polymer was measured, characteristic absorptions of the methacrylimide-containing polymer were observed at wave numbers of 1720 cm$^{-1}$, 1663 cm$^1$ and 750 cm$^{-1}$. Accordingly, the obtained polymer was identified as the methacrylimide-containing polymer. The results are shown below.

Intrinsic viscosity: 0.43
Total luminous transmittance (%): 92
MI value (g/10 min): 5.5
HDT (° C): 145
Imidization ratio (%): 72

REFERENTIAL EXAMPLES 2 THROUGH 4

Preparation of methacrylimide-containing polymers

Methacrylimide-containing polymers were prepared in the same manner as described in Referential Example 1 except that the kind and/or amount of the imidizing agent was changed. The results, together with the results obtained in Referential Example 1, are shown in Table 1.

REFERENTIAL EXAMPLE 5

Formation of grafting active sites on methacrylimide-containing polymer

A reaction vessel having an inner volume of 10 liters and equipped with a paddle spiral agitator, a pressure gauge, a sample pouring vessel and a heating jacket was charged with 100 parts of the methacrylimide-containing polymer obtained in Referential Example 1, 5 parts of toluene and 28 parts of allyl alcohol. The inner atmosphere of the reaction vessel was substituted with nitrogen and the mixture was heated at 200° C. with stirring to dissolve the polymer. Then, at 200° C., a liquid mixture comprising 2 parts of trimethylamine and 5 parts of toluene was added into the reaction vessel from the sample pouring vessel, and a reaction was carried out for 2 hours under an inner pressure of 40 kg/cm$^2$ gauge. After termination of the reaction, the formed allyl group-retained methacrylimide-containing polymer was reprecipitated from the solution, recovered by filtration, and dried under a reduced pressure at 100° C. to obtain a white powdery polymer. The properties of the grafted active site-retained methacrylimide-containing polymer are shown below.

Intrinsic viscosity: 0.43
Total luminous transmittance (%): 92
MI value (g/10 min): 6.0
Allyl group content (%): 5.5

The allyl group content was determined in the following manner. More specifically, the obtained allyl group-grafted active site-retained methacrylimide-containing polymer was measured based on TMS in chloroform as the solvent by an FT-NMR spectrometer (JNM-GSX-400 supplied by JEOL). The allyl group content was determined from the ratio between the proton integration value of the allyl group ($CH_2=CH-CH_2-$) and the proton integration value of the imide ring ($>N-CH_3$) of the methacrylimide-containing polymer, calculated from the obtained spectrum. Accordingly, the allyl group content was based on the methacrylimide-containing polymer.

REFERENTIAL EXAMPLES 6 THROUGH 8

Formation of grafting active sites on

TABLE 1

| Referential Example No. | Amount of PMMA (parts) | Imidizing agent kind | parts | MI (g/10 min) | HDT (°C.) | Imidization ratio (%) | Intrinsic viscosity | Total luminous transmittance (%) |
| --- | --- | --- | --- | --- | --- | --- | --- | --- |
| 1 | 100 | Methylamine | 21.7 | 5.5 | 145 | 72 | 0.43 | 92 |
| 2 | 100 | Methylamine | 26 | 2.5 | 160 | 90 | 0.40 | 92 |
| 3 | 100 | Ammonia | 10 | 3.0 | 152 | 51 | 0.48 | 89 |
| 4 | 100 | Ammonia | 20 | 1.0 | 198 | 72 | 0.43 | 89 |

PMMA: Methyl methacrylate polymer methacrylimide-containing polymers

Grafting active sites were formed in the same manner as described in Referential Example 5 by using the methacrylimide-containing polymers obtained in Referential Examples 2, 3 and 4. The results are collectively shown in Table 2.

TABLE 2

| Referential Example No. | Methacrylimide-containing polymer | Intrinsic viscosity | Total luminous transmittance (%) | MI value (g/10 min) | Allyl group content (%) |
| --- | --- | --- | --- | --- | --- |
| 5 | Referential Example 1 | 0.43 | 92 | 6.0 | 5.5 |

TABLE 2-continued

| Referential Example No. | Methacrylimide-containing polymer | Intrinsic viscosity | Total luminous transmittance (%) | MI value (g/10 min) | Allyl group content (%) |
|---|---|---|---|---|---|
| 6 | Referential Example 2 | 0.40 | 92 | 3.0 | 6.0 |
| 7 | Referential Example 3 | 0.48 | 88 | 3.5 | 6.0 |
| 8 | Referential Example 4 | 0.43 | 88 | 1.5 | 8.0 |

EXAMPLE 1

Methyl methacrylate polymer-grafted methacrylimide-polymer

A reaction vessel having an inner volume of 10 liters and equipped with a paddle spiral agitator, a cooling tube, a sample pouring vessel and a heating jacket was charged with 100 parts of the allyl group-grafted active site-retained methacrylimide-containing polymer obtained in Referential Example 5, 80 parts of toluene and 20 parts of methanol, and the mixture was heated with stirring to dissolve the polymer. A liquid mixture comprising 50 parts of methyl methacrylate, 0.05 part of benzoyl peroxide and 0.1 part of n-octylmercaptan was charged in the sample pouring vessel and the monomer mixture liquid was added over a period of 60 minutes into the reaction vessel maintained at 80° C., with stirring, to effect a graft polymerization in the presence of the allyl group-grafted active site-retained methacrylimide-containing polymer. After termination of the addition, the reaction mixture was heated and stirred for 180 minutes to complete the reaction. The formed grafted polymer was re-precipitated from the reaction liquid with methanol, recovered by filtration, and dried at 80° C. under a reduced pressure to obtain a white powdery polymer. When the polymerization conversion was measured by gas chromatography, it was found that the conversion was 92%. The physical properties of the obtained methyl methacrylate polymer-grafted methacrylimide-containing polymer are shown below.

Intrinsic viscosity: 0.53
Total luminous transmittance (%): 92
MI value (g/10 min): 8.7
HDT (° C.): 130
Grafting ratio (%): 22

The formed polymer was a methyl methacrylate-grafted methacrylimide-containing polymer having an excellent heat resistance and a good moldability.

EXAMPLE 2

Styrene/acrylonitrile copolymer-grafted methacrylimide-containing polymer

A reaction vessel having an inner volume of 10 liters and equipped with a screw agitator, a cooling tube, a sample pouring vessel, and a heating jacket was charged with 200 parts of deionized water, 0.01 part of partially saponified polyvinyl alcohol (supplied by Nippon Synthetic Chemical Industry; saponification degree=50%), and 0.1 part of sodium sulfate to form a solution, and a solution comprising 50 parts of the allyl group-grafted active site-retained methacrylimide-containing polymer obtained in Referential Example 5, 37 parts of styrene, 13 part of acrylonitrile, 0.05 part of benzoyl peroxide, and 0.1 part of n-octylmercaptan was charged in the sample pouring vessel and added to the reaction vessel with stirring. After the addition, the mixture was heated at 80° C. with stirring, and the stirring was conducted for 2 hours to complete a suspension polymerization. A bead-like polymer having a diameter of about 1 mm was formed in the obtained reaction liquid, and the bead-like polymer was dried at 100° C. The polymerization conversion was 95%.

The physical properties of the obtained styrene/acrylonitrile copolymer-grafted methacrylimide-containing polymer are shown below.

Intrinsic viscosity: 0.55
Total luminous transmittance (%): 90
MI value (g/10 min): 13.0
HDT (° C.): 125
Grafting ratio (%): 30

The formed polymer was a styrene/acrylonitrile copolymer-grafted methacrylimide-containing polymer having an excellent heat resistance and retaining a good moldability.

EXAMPLE 3

Styrene polymer-grafted methacrylimide-containing polymer

A solution of 2 parts of sodium lauryl sulfate in 200 parts of deionized water was mixed with a solution of 50 parts of the allyl group-grafted active site-retained methacrylimide-containing polymer in 50 parts of styrene, 0.05 part of benzoyl peroxide and 0.1 part of n-octylmercaptan, and the mixture was emulsified and dispersed at 10,000 rpm by using a homomixer. The formed dispersion was charged in a reaction vessel equipped with a screw agitator, a cooling tube and a heating jacketed, and the temperature in the reaction vessel was elevated to 80° C. with stirring. The stirring was conducted for 120 minutes to complete the emulsion polymerization. An aqueous solution of calcium chloride as the coagulant was added to the obtained emulsion latex, and the reaction product was recovered and dried at 100° C. under a reduced pressure. The physical properties of the obtained styrene polymer-grafted methacrylimide-containing polymer are shown below.

Intrinsic viscosity: 0.55
Total luminous transmittance (%): 90
MI value (g/10 min): 15
HDT (° C): 122
Grafting ratio (%): 35

The formed polymer was a styrene polymer-grafted methacrylimide-containing polymer having an excellent heat resistance and retaining a good moldability.

EXAMPLES 4 THROUGH 9

Polymer-crafted methacrylimide-containing polymer

Various monomers shown below were independently graft-polymerized in the presence of the allyl group-grafted active site-retained methacrylimide-containing polymer obtained in Referential Example 5 in the same manner as described in Example 1 to prepare grafted methacrylimide-containing polymers. The results are collectively shown in Table 3.

TABLE 3

| Example No. | Kind and amount (parts) of monomer and ratio | | Methacrylimide-containing polymer of Referential Example 5 (parts) | MI value (g/10 min) | HDT (°C.) | Grafting ratio (%) |
| --- | --- | --- | --- | --- | --- | --- |
| 1 | Methyl methacrylate | 50 | 100 | 8.7 | 130 | 22 |
| 2 | Styrene/acrylonitrile | 37/13 | 50 | 13.0 | 125 | 30 |
| 3 | Styrene | 50 | 50 | 15.0 | 122 | 35 |
| 4 | αMethylstyrene/acrylonitrile | 25/25 | 100 | 6.5 | 135 | 25 |
| 5 | Styrene/maleic anhydride | 40/10 | 100 | 5.5 | 135 | 30 |
| 6 | Vinylidene chloride | 50 | 100 | 6.0 | 135 | 30 |
| 7 | Styrene/glycidyl methacrylate | 47/3 | 100 | 11.0 | 132 | 33 |
| 8 | Vinyl chloride | 50 | 100 | 8.5 | 126 | 25 |
| 9 | Methyl methacrylate/phenylmaleimide | 48/2 | 100 | 6.5 | 133 | 23 |

EXAMPLES 10 THROUGH 18

Polymer-grafted methacrylimide-containing polymers

Various monomers shown below were independently graft-polymerized in the presence of the allyl group-grafted active site-retained methacrylimide-containing polymer obtained in Referential Example 6 to prepare grafted methacrylimide-containing polymers. The results are collectively shown in Table 4.

TABLE 4

| Example No. | Kind and amount (parts) of monomer and ratio | | Methacrylimide-containing polymer of Referential Example 5 (parts) | MI value (g/10 min) | HDT (°C.) | Grafting ratio (%) |
| --- | --- | --- | --- | --- | --- | --- |
| 10 | Methyl methacrylate | 50 | 100 | 6.0 | 145 | 20 |
| 11 | Styrene/acrylonitrile | 37/13 | 50 | 7.5 | 140 | 26 |
| 12 | Styrene | 50 | 50 | 7.8 | 137 | 30 |
| 13 | αMethylstyrene/acrylonitrile | 25/25 | 100 | 4.5 | 150 | 24 |
| 14 | Styrene/maleic anhydride | 40/10 | 100 | 4.5 | 150 | 25 |
| 15 | Vinylidene chloride | 50 | 100 | 3.9 | 150 | 25 |
| 16 | Styrene/glycidyl methacrylate | 47/3 | 100 | 5.5 | 147 | 30 |
| 17 | Vinyl chloride | 50 | 100 | 7.8 | 141 | 22 |
| 18 | Methyl methacrylate/phenylmaleimide | 48/2 | 100 | 5.3 | 148 | 20 |

COMPARATIVE EXAMPLE 1

Mixture of methyl methacrylate polymer and methacrylimide polymer

A reaction vessel having an inner volume of 10 liters and equipped with a paddle spiral agitator, a cooling tube, a sample pouring vessel and a heating jacket was charged with 100 parts of the methacrylimide-containing polymer obtained in Referential Example 1, 80 parts of toluene and 20 parts of methanol, and the mixture was maintained at 80° C. with stirring to dissolve the polymer. A mixed solution comprising 50 parts of methyl methacrylate, 0.05 part of benzoyl peroxide and 0.1 part of n-octylmercaptan was charged in the sample pouring vessel and the monomer mixture liquid was added over a period of 60 minutes into the reaction vessel maintained at 80° C. with stirring to effect a graft polymerization in the presence of the methacrylimide-containing polymer. After termination of the addition, stirring under heating was conducted for 180 minutes to complete the reaction. The formed polymer was re-precipitated from the reaction solution with methanol, recovered by filtration and dried at 80° C. under pressure to obtain a white powdery polymer. When the polymerization conversion was measured by gas chromatography, it was found that the conversion was 90%.

The physical properties of the obtained mixture of the methyl methacrylate polymer and the methacrylimide-containing polymer are shown below.

Intrinsic viscosity: 0.52
Total luminous transmittance (%): 20
MI value (g/10 min): 8.0
HDT (° C): 128
Grafting ratio (%): 0

The obtained mixture was a methyl methacrylate polymer-methacrylimide-containing polymer mixture having an excellent heat resistance but white and opaque in appearance.

COMPARATIVE EXAMPLE 2

Mixture of styrene/acrylonitrile copolymer and methacrylimide-containing polymer A reaction vessel having an inner volume of 10 liters and equipped with a screw agitator, a cooling tube, a sample pouring vessel and a heating jacket was charged with a solution of 0.01 part of partially saponified polyvinyl alcohol (supplied by Nippon Synthetic Chemical Industry, saponification degree=50%) and 0.1 part of sodium sulfate in 200 parts of deionized water, and a solution of 50 parts of the methacrylimide-containing polymer obtained in Referential Example 1 in a mixture of 37 parts of styrene, 13 parts of acrylonitrile, 0.05 part of benzoyl peroxide and 0.1 part of n-octylmercaptan was charged in the sample injector and added to the reaction vessel with stirring. After the addition, the mixture was heated at 80° C. with stirring, and the stirring was conducted for 2 hours to complete the suspension polymerization. A bead-like polymer having a diameter of about 1 mm was contained in the reaction liquid, and the bead-like polymer was dried at 100° C. The polymerization conversion was 95%.

The physical properties of the obtained mixture of the styrene/acrylonitrile copolymer and the methacrylimide-containing polymer are shown below.

Intrinsic viscosity: 0.53
Total luminous transmittance (%): 15
MI value (g/10 min): 15.0
HDT (° C): 122
Grafting ratio (%): 0

The obtained mixture was a styrene/acrylonitrile copolymer-methacrylimide-containing polymer mixture having an excellent heat resistance but white and opaque in appearance.

COMPARATIVE EXAMPLE 3

Mixture of styrene polymer and methacrylimide-containing polymer

A solution of 2 parts of sodium lauryl sulfate in 200 parts of deionized water was mixed with a solution of 50 parts of the methacrylimide-containing polymer obtained in Referential Example 1 in a mixture of 50 parts of styrene, 0.05 part of benzoyl peroxide and 0.1 part of n-octylmercaptan, and the mixture was emulsified and dispersed at 10,000 rpm by a homomixer. The dispersion was charged in a reaction vessel equipped with a screw agitator, a cooling tube and a heating jacket, and the inner temperature of the reaction vessel was elevated with stirring, and the stirring was conducted for 120 minutes to complete the emulsion polymerization. An aqueous solution of calcium chloride as the coagulant was added to the obtained emulsion latex, and the reaction product was recovered and dried at 100° C. under a reduced pressure. The polymerization conversion was 98%.

The physical properties of the obtained mixture of the obtained styrene polymer and the methacrylimide-containing polymer are shown below.

Intrinsic viscosity: 0.53
Total luminous transmittance (%): 19
MI value (g/10 min): 13
HDT (° C): 120
Grafting ratio (%): 0

The obtained mixture was a styrene polymer-methacrylimide-containing polymer mixture having an excellent heat resistance but white and opaque in appearance.

EXAMPLE 19

A mixture comprising the styrene/acrylonitrile copolymer-grafted methacrylimide-containing copolymer obtained in Example 11 and a styrene/acrylonitrile copolymer (Cevian-N supplied by Daicel Chemical Industries) at a blend ratio of 70/30 was melt-extruded by a single-screw vented extruder (cylinder temperature =280° C., die temperature=270° C.) and pelletized. The obtained pellet was injection-molded into a dumbbell specimen No. 1, and the physical properties of the resin composition were determined. The amount of the methacrylimide-containing polymer in the resin composition was 35%. The results are collectively shown in Table 5.

EXAMPLE 20

In the same manner as described in Example 19, a mixture comprising the styrene/acrylonitrile copolymer-grafted methacrylimide-containing polymer obtained in Example 11 and an ABS resin [resin obtained by graft-copolymerizing 40 parts of styrene/acrylonitrile (70/30 weight ratio) to 60 parts of butadiene] at a blend ratio of 70/30 was melt-extruded by a single-screw vented extruder (cylinder temperature=280° C., die temperature=270° C.) and pelletized. The obtained pellet was injection-molded into a dumbbell specimen No. 1 and the physical properties of the resin composition were measured. The amounts of the methacrylimide-containing polymer and the ABS resin in the resin composition were 35% and 30%, respectively. The results were collectively shown in Table 5.

COMPARATIVE EXAMPLE 4

A mixture comprising the methacrylimide-containing polymer obtained in Referential Example 2 and a styrene/acrylonitrile copolymer (Cevian-N supplied by Daicel Chemical Industries) at a blend ratio of 35/65 was melt-extruded by a single-screw vented extruder and pelletized. The pellet was injection-molded, and the physical properties of the blend were evaluated. The results are collectively shown in Table 5.

COMPARATIVE EXAMPLE 5

A mixture comprising the methacrylimide-containing polymer obtained in Referential Example 2, the ABS resin used in Example 20 and the styrene/acrylonitrile copolymer used in Example 19 at a blend ratio of 35/30/35 was melt-extruded by an extruder and pelletized. The pellet was injection-molded, and the physical properties of the blend were evaluated. The results are collectively shown in Table 5.

TABLE 5

| Example and comparative Example No. | Composition (parts) | | | | HDT (°C.) | Izod impact strength (kg · cm/cm$^2$) | Flowability, MI value (g/10 min) |
|---|---|---|---|---|---|---|---|
| | Methacrylimide-containing polymer component | Grafting component | Other thermoplastic polymer | component | | | |
| Example 19 | 35 | Styrene-acrylonitrile 35 | Styrene/acrylonitrile copolymer 30 | | 115 | 3.0 | 15 |
| Example 20 | 35 | Styrene-acrylonitrile 35 | ABS 30 | | 102 | 35 | 22 |
| Comparative Example 4 | 35 | | Styrene/acrylonitrile copolymer 65 | | 112 | 2.0 | 10 |
| Comparative | 35 | | Styrene/ | ABS | 98 | 25 | 17 |

TABLE 5-continued

| Example and comparative Example No. | Composition (parts) | | | | HDT (°C.) | Izod impact strength (kg·cm/cm²) | Flowability, MI value (g/10 min) |
|---|---|---|---|---|---|---|---|
| | Methacrylimide-containing polymer component | Grafting component | Other thermoplastic polymer | component | | | |
| Example 5 | | | acrylonitrile copolymer | 30 | | | |
| | | | 35 | | | | |

The resin composition obtained in Example 19 was superior to the blend of Comparative Example 4 in flowability and compatibility of the components. Furthermore, the resin composition of Example 20 was superior to the blend of Comparative Example 5 in impact resistance and compatibility of the components.

EXAMPLE 21

A mixture comprising the methyl methacrylate polymer-grafted methacrylimide-containing polymer obtained in Example 10 and a methyl methacrylate polymer (Acrypet VH supplied by Mitsubishi Rayon) at a blend ratio of 60/40 was melt-extruded in a single-screw vented extruder (cylinder temperature=280° C., die temperature=270° C.) and pelletized. The obtained pellet was injection-molded into a dumbbell specimen No. 1, and the physical properties of the resin composition were determined. The amount of the methacrylimide-containing polymer in the resin composition was 40%. The results are collectively shown in Table 6.

EXAMPLE 22

In the same manner as described in Example 21, a mixture comprising the methyl methacrylate polymer-grafted methacrylimide-containing polymer obtained in Example 10 and a (meth)acrylic acid ester type multi-layer polymer [polymer obtained by grafting 40 parts of methyl methacrylate to 60 parts of a methyl acrylate/styrene (80/20) rubber copolymer] at a blend ratio of 60/40 was melt-extruded by a single-screw vented extruder (cylinder temperature=280° C., die temperature=270° C.) and pelletized. The obtained pellet was injection-molded into a dumbbell specimen No. 1, and the physical properties of the resin composition were determined. The amounts of the methacrylimide-containing polymer and the (meth)acrylic acid ester type ester type multi-layer polymer in the resin composition were 40% and 40%, respectively. The results are collectively shown in Table 6.

COMPARATIVE EXAMPLE 6

A mixture comprising the methacrylimide-containing polymer obtained in Referential Example 2 and a methyl methacrylate polymer (supplied by Mitsubishi Rayon) at a blend ratio of 40/60 was melt-extruded by a single-screw vented extruder and pelletized. The pellet was injection-molded. The physical properties of the blend were determined. The results are collectively shown in Table 6.

COMPARATIVE EXAMPLE 7

A mixture comprising the methacrylimide-containing polymer obtained in Referential Example 2, the (meth)acrylic acid ester type multi-layer polymer and the methyl methacrylate polymer at a blend ratio of 40/20/40 was melt-extruded by an extruder and pelletized. The pellet was injection-molded, and the physical properties of the blend were determined. The results are shown in Table 6.

TABLE 6

| Example and comparative Example No. | Composition (parts) | | | | HDT (°C.) | Izod impact strength (kg·cm/cm²) | Total luminous transmittance (%) |
|---|---|---|---|---|---|---|---|
| | Methacrylimide-containing polymer component | Grafting component | Other thermoplastic polymer | component | | | |
| Example 21 | 40 | MMA 20 | PMMA 40 | | 120 | 2.0 | 91 |
| Example 22 | 40 | MMA 20 | | (Meth)acrylic multi-layer polymer 40 | 111 | 7.0 | 90 |
| Comparative Example 6 | 40 | | PMMA 40 | | 119 | 1.5 | 53 Opaque |
| Comparative Example 7 | 40 | | PMMA 20 | (Meth)acrylic multi-layer copolymer 20 | 110 | 2.5 | 50 Opaque |

MMA: methyl methacrylate
PMMA: methyl methacrylate polymer

The resin composition of Example 21 was superior to the blend of Comparative Example 6 in transparency and compatibility of the components. Furthermore, the resin composition of Example 22 was superior to the blend of Comparative Example 7 in impact strength and compatibility of the components.

EXAMPLE 23

A mixture comprising the styrene polymer-grafted methacrylimide-containing polymer obtained in Example 12 and a styrene polymer (Dialac HF-77 supplied by Mitsubishi Monsanto) at a blend ratio of 70/30 was melt-extruded by a single-screw vented extruder (cylinder temperature=280° C., die temperature=270° C.) and pelletized. The obtained pellet was injection-molded into a dumbbell specimen No. 1, and the physical properties of the resin composition were determined. The amount of the methacrylimide-containing polymer in the resin composition was 35%. The results are collectively shown in Table 7.

EXAMPLE 24

In the same manner as described in Example 23, a mixture comprising the styrene polymer-grafted methacrylimide-containing polymer obtained in Example 12 and high-impact polystyrene (Dialac HT-60 supplied by Mitsubishi Monsanto) at a blend ratio of 70/30 was melt-kneaded by a single-screw vented extruder (cylinder temperature=280° C., die temperature=270° C.) and pelletized. The pellet was injection-molded into a dumbbell specimen No. 1, and the physical properties of the resin composition were determined. The amounts of the methacrylimide-containing polymer and the high-impact styrene resin in the resin composition were 35% and 30%, respectively. The results are collectively shown in Table 7.

EXAMPLE 25

In the same manner as described in Example 23, a blend comprising the styrene polymer-grafted methacrylimide-containing polymer obtained in Example 12 and modified polyphenylene oxide (Noryl 731J supplied by Engineering Rasuck) at a blend ratio of 70/30 was melt-extruded by a single-screw vented extruder (cylinder temperature=280° C., die temperature=270° C.) and pelletized. The obtained pellet was injection-molded into a dumbbell specimen No. 1, and the physical properties of the resin composition were determined. The amounts of the methacrylimide polymer and the modified polyphenylene oxide in the resin composition were 35% and 30%, respectively. The results are collectively shown in Table 7.

COMPARATIVE EXAMPLE 8

A mixture comprising the methacrylimide-containing polymer obtained in Referential Example 2 and a styrene copolymer (Dialac HF-77 supplied by Mitsubishi Monsanto) at a blend ratio of 35/65 was melt-extruded by a single-screw vented extruder and pelletized. The pellet was injection-molded, and the physical properties of the blend were determined. The results are collectively shown in Table 7.

COMPARATIVE EXAMPLE 9

A mixture comprising the methacrylimide-containing polymer obtained in Referential Example 2, the above-mentioned styrene polymer and the above-mentioned high-impact polystyrene resin at a blend ratio of 35/35/30 was melt-extruded and pelletized. The obtained pellet was injection-molded, and the physical properties of the blend were determined. The results are collectively shown in Table 7.

COMPARATIVE EXAMPLE 10

A mixture comprising the methacrylimide-containing polymer obtained in Referential Example 2, the above-mentioned styrene polymer and the above-mentioned modified polyphenylene oxide at a blend ratio of 35/35/30 was melt-extruded by a single-screw vented extruder and pelletized. The pellet was injection-molded, and the physical properties of the blend were determined. The results are collectively shown in Table 7.

TABLE 7

| Example and comparative Example No. | Composition (parts) | | | | HDT (°C.) | Izod impact strength (kg · cm/cm$^2$) | Flowability, MI value (g/10 min) |
| --- | --- | --- | --- | --- | --- | --- | --- |
| | Methacryl-imide-containing polymer component | Grafting component | Other thermoplastic | | | | |
| | | | polymer | component | | | |
| Example 23 | 35 | St 35 | PSt 30 | | 105 | 2.0 | 25 |
| Example 24 | 35 | St 35 | | High-impact polystyrene 30 | 90 | 10 | 30 |
| Example 25 | 35 | St 35 | | Modified polyphenylene 30 | 135 | 8.5 | 5.5 |
| Comparative Example 8 | 35 | | PSt 65 | | 104 | 1.5 | 20 |
| Comparative Example 9 | 35 | | PSt 35 | High-impact polystyrene 30 | 87 | 6 | 24 |
| Comparative Example 10 | 35 | | PSt 35 | Modified polyphenyleneoxide 30 | 133 | 5 | 3.0 |

PSt: polystyrene

The resin composition of Example 23 was superior to Comparative Example 8 in flowability. Furthermore, the resin compositions of Examples 24 and 25 were superior to the blends of Comparative Examples 9 and 10 in impact strength and compatibility of the components.

EXAMPLE 26

A mixture comprising the styrene/glycidyl methacrylate copolymer-grafted methacrylimide-containing polymer obtained in Example 16 and polybutylene terephthalate (Tufpet PBT N-1000 supplied by Mitsubishi Rayon) at a blend ratio of 60/40 was melt-extruded by a single-screw vented extruder (cylinder temperature =280° C., die temperature=270° C.) and pelletized. The obtained pellet was injection-molded into a dumbbell specimen No. 1, and the physical properties of the resin composition were determined. The amounts of the methacrylimide-containing polymer and the polybutylene terephthalate in the resin composition were 40% and 40%, respectively. The results are collectively shown in Table 8.

EXAMPLE 27

A mixture comprising the styrene/glycidyl methacrylate copolymer-grafted methacrylimide-containing polymer and polyethylene terephthalate (Pokan B1505 supplied by Bayer) at a blend ratio of 60/40 was melt-extruded by a single-screw vented extruder (cylinder temperature=280° C., dye temperature=270° C.) and pelletized. The obtained pellet was injection-molded into a dumbbell specimen No. 1, and the physical properties of the resin composition were determined. The amounts of the methacrylimide-containing polymer and the polyethylene terephthalate in the resin composition were 40% and 40%, respectively. The results are collectively shown in Table 8.

EXAMPLE 28

A blend comprising the styrene/glycidyl methacrylate copolymer-grafted methacrylimide-containing polymer obtained in Example 16 and a polyarylate (U Polymer U-100 supplied by Unitica) at a blend ratio of 60/40 was melt-extruded by a single-screw vented extruder (cylinder temperature=280° C., die temperature =270° C.) and pelletized. The obtained pellet was injection-molded into a dumbbell specimen No. 1, and the physical properties of the resin composition were determined. The amounts of the methacrylimide-containing polymer and the polyarylate resin in the resin composition were 40% and 40%, respectively. The results are collectively shown in Table 8.

COMPARATIVE EXAMPLE 11

A mixture comprising the methacrylimide-containing polymer obtained in Referential Example 2, a styrene/glycidyl methacrylate copolymer (copolymer obtained by radical polymerization of 94 parts of styrene and 6 parts of glycidyl methacrylate at 80° C. by using 0.1% of benzoyl peroxide and 0.2% of n-octylmercaptan) and the above-mentioned polybutylene terephthalate used in Example 26 at a blend ratio of 40/20/40 was melt-extruded by a single-screw vented extruder and pelletized. The pellet was injection-molded, and the physical properties of the blend were determined. The results were collectively shown in Table 8.

COMPARATIVE EXAMPLE 12

A mixture comprising the methacrylimide-containing polymer obtained in Referential Example 2, the styrene/glycidyl methacrylate copolymer used in Comparative Example 1 and the above-mentioned polyethylene terephthalate used in Example 27 at a blend ratio of 40/20/40 was melt-extruded by a single-screw vented extruder and pelletized. The pellet was injection-molded, and the physical properties of the blend were determined. The results are collectively shown in Table 8.

COMPARATIVE EXAMPLE 13

A mixture comprising the methacrylimide-containing polymer obtained in Referential Example 2, the styrene/glycidyl methacrylate copolymer used in Comparative Example 11 and the above-mentioned polyarylate resin at a blend ratio of 40/20/40 was melt-extruded by a single screw-vented extruder and pelletized. The obtained pellet was injection-molded, and the physical properties of the blend were determined. The results are collectively shown in Table 8.

TABLE 8

| Example and comparative Example No. | Composition (parts) | | | | HDT (°C.) | Izod impact strength (kg·cm/cm$^2$) | Flowability, MI value (g/10 min) |
|---|---|---|---|---|---|---|---|
| | Methacrylimide polymer component | Grafting component | Other thermoplastic polymer | component | | | |
| Example 26 | 40 | St/GMA 20 | | PBT 40 | 100 | 3 | 22 |
| Example 27 | 40 | St/GMA 20 | | PBT 40 | 112 | 3 | 17 |
| Example 28 | 40 | St/GMA 20 | | Polyacrylate 40 | 155 | 10 | 4.0 |
| Comparative Example 11 | 40 | | (St·GMA) copolymer 20 | PBT 20 | 93 | 1.5 | 17 |
| Comparative Example 12 | 40 | | (St·GMA) copolymer 20 | PET 20 | 100 | 1.5 | 13 |
| Comparative Example 13 | 40 | | (St·GMA) copolymer 20 | Polyacrylate 20 | 145 | 6 | 1.0 |

(St/GMA) styrene/glycidyl methacrylate copolymer
PBT: polybutylene terephthalate
PET: polyethylene terephthalate The resin composition of Example 26, 27 and 28 were superior to the blends of Comparative Examples 11, 12 and 13 in heat resistance, flowability, and impact strength.

EXAMPLE 29

A mixture comprising the styrene/maleic anhydride copolymer-grafted methacrylimide-containing polymer obtained in Example 14 and nylon 66 (Zytel 101 supplied by Du Pont) at a blend ratio of 60/40 was melt-extruded by a single-screw vented extruder (cylinder temperature =280° C., die temperature=270° C.) and pelletized. The obtained pellet was injection-molded into a dumbbell specimen No. 1, and the physical properties of the resin composition were determined. The amounts of the methacrylimide-containing polymer and the nylon 66 resin in the resin composition were 40% and 40%, respectively. The results are collectively shown in Table 9.

EXAMPLE 30

A mixture comprising the styrene/maleic anhydride copolymer-grafted methacrylimide-containing polymer obtained in Example 14, and nylon 6 (UBE Nylon 1013B supplied by Ube Industries) at a blend ratio of 60/40 was melt-extruded by a single-screw vented extruder (cylinder temperature=280° C., die temperature=270° C.) and pelletized. The obtained pellet was injection-molded into a dumbbell specimen No. 1, and the physical properties of the resin composition were determined. The amounts of the methacrylimide-containing polymer and the nylon 6 in the resin composition were 40% and 40%, respectively. The results are collectively shown in Table 9.

EXAMPLE 31

A blend comprising the methyl methacrylate polymer-grafted methacrylimide-containing polymer obtained in Example 10, a vinyl chloride compound (described below) and an MBS modifier (described below) at a blend ratio of 30/60/10 was melt-extruded by an extruder (cylinder temperature=200° C., die temperature=180° C.) and pelletized. The obtained pellet was injection-molded into a dumbbell specimen No. 1, and the physical properties of the resin composition were determined. The amount of the methacrylimide-containing polymer in the resin composition was 20%. The results are collectively shown in Table 9.

| Vinyl Chloride Compound: | |
|---|---|
| Polyvinyl chloride (supplied by Mitsubishi Kasei, polymerization degree = 1,100) | 92 parts |
| Glycerol monostearate | 3 parts |
| Butyl acrylate/styrene/methyl methacrylate copolymer | 1 part |
| Di-(methyl)bis-S,S'-tin(alkylmercaptoacetate) | 4 parts |
| MBS Modifier: | |

Graft copolymer comprising butadiene (60 parts), styrene (10 parts), methyl methacrylate (15 parts) and styrene (15 parts)

EXAMPLE 32

A mixture comprising the vinyl chloride polymer-grafted methacrylimide-containing polymer obtained in Example 17 and the above-mentioned vinyl chloride compound and MBS modifier at a blend ratio of 30/60/10 was melt-extruded by a single-screw vented extruder (cylinder temperature=200° C., die temperature=180° C.) and pelletized. The obtained pellet was injection-molded into a dumbbell specimen No. 1, and the physical properties of the resin composition were determined. The amount of the methacrylimide-containing polymer in the resin composition was 20%. The results are collectively shown in Table 9.

EXAMPLE 33

A mixture comprising the methyl methacrylate polymer-grafted methacrylimide-containing polymer obtained in Example 10 and a vinylidene fluoride polymer (Kynar 720 supplied by Pennwalt) at a blend ratio of 60/40 was melt-extruded by a single-screw vented extruder and pelletized. The pellet was injection-molded into a dumbbell specimen No. 1, and the physical properties of the resin composition were determined. The amounts of the methacrylimide-containing polymer and the vinylidene fluoride polymer in the resin composition were 40% and 40%, respectively. The results are collectively shown in Table 9.

EXAMPLE 34

A mixture comprising the styrene/glycidyl methacrylate copolymer-grafted methacrylimide-containing polymer obtained in Example 16 and a polyamide-imide (Torlon 4203L supplied by Mitsubishi Kasei) at a blend ratio of 60/40 was melt-extruded by a single-screw vented extruder and pelletized. The obtained pellet was injection-molded, and the physical properties of the resin composition were determined. The amounts of the methacrylimide-containing polymer and the polyamide in the resin composition were 40% and 40%, respectively. The results are collectively shown in Table 9.

EXAMPLE 35

A mixture comprising the styrene/glycidyl methacrylate copolymer-grafted methacrylimide-containing polymer obtained in Example 16 and a polysulfone (Udel Polysulfone P-1700 supplied by Nissan Chemical Industries) at a blend ratio of 60/40 was melt-extruded by a single-screw vented extruder and pelletized. The obtained pellet was injection-molded into a dumbbell specimen No. 1, and the physical properties of the resin composition were determined. The amounts of the methacrylimide-containing polymer and the polysulfone resin in the resin composition were 40% and 40%, respectively. The results are collectively shown in Table 9.

EXAMPLE 36

A mixture comprising the styrene/glycidyl methacrylate copolymer-grafted methacrylimide-containing polymer obtained in Example 16 and a polyether-ether ketone (PEEK Natural supplied by ICI Japan) at a blend ratio of 60/40 was melt-extruded by a single-screw vented extruder and pelletized. The obtained pellet was injection-molded into a dumbbell specimen No. 1, and the physical properties of the resin composition were determined. The amounts of the methacrylimide-containing polymer and the polyether-ether ketone in the resin composition were 40% and 40%, respectively. The results are collectively shown in Table 9.

EXAMPLE 37

A mixture comprising the styrene/glycidyl methacrylate copolymer-grafted methacrylimide-containing polymer obtained in Example 16 and a polyether-imide (Ultem 1000 supplied by General Electric) at a blend ratio of 60/40 was melt-extruded by a single-screw vented extruder and pelletized. The obtained pellet was injection-molded into a dumbbell specimen No. 1, and the physical properties of the resin composition were determined. The amounts of the methacrylimide-containing polymer and the polyether-imide polymer in the resin composition were 40% and 40%, respectively. The results are collectively shown in Table 9.

EXAMPLE 38

A mixture comprising the styrene/glycidyl methacrylate copolymer-grafted methacrylimide-containing polymer obtained in Example 16 and a polyether-sulfone (Polyether Sulfone 420P supplied by ICI Japan) at a blend ratio of 60/40 was melt-extruded by a single screw vented extruder and pelletized. The obtained pellet was injection-molded into a dumbbell specimen No. 1, and the physical properties of the resin composition were determined. The amounts of the methacrylimide-containing polymer and the polyether-sulfone in the resin composition were 40% and 40%, respectively. The results are collectively shown in Table 9.

EXAMPLE 39

A mixture comprising the styrene polymer-grafted methacrylimide-containing polymer and polycarbonate (Iupilon S-2000 supplied by Mitsubishi Gas Chemical) at a blend ratio of 60/40 was melt-extruded by a single-screw vented extruder and pelletized. The obtained pellet was injection-molded into a dumbbell specimen No. 1, and the physical properties of the resin composition were determined. The amounts of the methacrylimide-containing polymer and the polycarbonate in the resin composition were 30% and 40%, respectively. The results are collectively shown in Table 9.

EXAMPLE 40

A mixture comprising the styrene/acrylonitrile copolymer-grafted methacrylimide-containing polymer obtained in Example 11, the polycarbonate used in Example 39 and the ABS resin used in Example 20 at a blend ratio of 60/20/20 was melt-extruded by a single-screw vented extruder and pelletized. The obtained pellet was injection-molded into a dumbbell specimen No. 1, and the physical properties of the resin composition were determined. The amounts of the methacrylimide-containing polymer, the polycarbonate, and the ABS resin in the resin composition were 30%, 20% and 20%, respectively. The results are collectively shown in Table 9.

EXAMPLE 41

A mixture comprising the styrene/maleic anhydride copolymer-grafted methacrylimide-containing polymer obtained in Example 14, the nylon 66 used in Example 29 and a rubber-reinforced modified polyolefin (Tufmer MP-680 supplied by Mitsui Petrochemical Industries) at a blend ratio of 60/20/20 was melt-extruded by a single-screw vented extruder and pelletized. The obtained pellet was injection-molded into a dumbbell specimen No. 1, and the physical properties of the resin composition were determined. The amounts of the methacrylimide-containing resin, the nylon 66 and the modified polyolefin in the resin composition were 40%, 20% and 20%, respectively. The results are collectively shown in Table 9.

EXAMPLE 42

A mixture comprising the methyl methacrylate polymer-grafted methacrylimide polymer obtained in Example 10 and a (meth)acrylic acid ester type multi-layer polymer (described below) at a blend ratio of 60/40 was melt-extruded by a single-screw vented extruder and pelletized. The obtained pellet was injection-molded into a dumbbell specimen No. 1, and the physical properties of the resin composition were determined. The amounts of the methacrylimide-containing polymer and the (meth)acrylic acid ester type multi-layer polymer in the resin composition were 40% and 40%, respectively. The results are collectively shown in Table 9.

(Meth)acrylic acid ester type multi-layer polymer:

Thermoplastic grafted polymer comprising butyl acrylate (50 parts)-(butyl acrylate/methyl methacrylate)(10 parts/5 parts)-(butyl acrylate/methyl methacrylate)(5 parts/10 parts)-methyl methacrylate (20 parts)

COMPARATIVE EXAMPLES 14 THROUGH 25

For comparison, the physical properties of the other thermoplastic polymers blended in the methacrylimide-containing polymers in Examples 29 through 42 are collectively shown in Table 9.

TABLE 9

| Example and comparative Example No. | Methacrylimide component (parts) | Grafting component (parts) | Other thermoplastic polymer (parts) | | HDT (°C.) | Izod impact strength (kg · cm/cm$^2$) | Flowability, MI value (g/10 min) |
| --- | --- | --- | --- | --- | --- | --- | --- |
| Example 29 | 40 | St/MunH 20 | Nylon 66 | 40 | 110 | 2 | 10*[1] |
| Comparative Example 14 | — | — | Nylon 66 | | 70 | 4.0 | 15*[1] |
| Example 30 | 40 | St/MunH 20 | Nylon 6 | 40 | 105 | 3 | 12 |
| Comparative Example 15 | — | — | Nylon 6 | | 60 | 6.0 | 30 |
| Example 31 | 20 | MMA 10 | PVCl 60 | MBS 10 | 80 | 25 | 15*[2] |
| Example 32 | 20 | VCl 10 | PVCl 60 | MBS 10 | 82 | 20 | 20*[2] |
| Comparative Example 16 | — | — | PVCl 60 | MBS 10 | 60 | 27 | 22*[2] |
| Comparative Example 17 | — | — | PVCl 90 | MBS 10 | 65 | 25 | 20*[2] |
| Example 33 | 40 | MMA 20 | PVdF | 40 | 125 | 10 | 17 |
| Comparative Example 18 | — | — | PVdF | | 90 | 15 | 25 |
| Example 34 | 40 | St/GMA 20 | Polyamide-imide | 40 | 200 | 3 | 2.0 |
| Comparative Example 19 | — | — | Polyamide-imide | | 270 | 3 | *[3] |
| Example 35 | 40 | St/GMA 20 | Polysulfone | 40 | 160 | 5 | 2.5 |
| Comparative Example 20 | — | — | Polysulfone | | 175 | 7 | *[3] |
| Example 36 | 40 | St/GMA 20 | Polyether-ether | 40 | 145 | 5 | 5.0 |
| Comparative Example 21 | — | — | Polyether-ether | | 155 | 6 | *[3] |
| Example 37 | 40 | St/GMA | Polyether-imide | 40 | 165 | 3 | 2.0 |

TABLE 9-continued

| Example and comparative Example No. | Methacryl-imide component (parts) | Grafting component (parts) | Other thermoplastic polymer (parts) | | HDT (°C.) | Izod impact strength (kg·cm/cm²) | Flowability, MI value (g/10 min) |
|---|---|---|---|---|---|---|---|
| | | 20 | | | | | |
| Comparative Example 22 | — | — | Polyether-imide | | 200 | 3 | *3 |
| Example 38 | 40 | St/GMA 20 | Polyether-sulfone | 40 | 160 | 5 | 2.5 |
| Comparative Example 23 | — | — | Polyether-sulfone | | 185 | 7 | *3 |
| Example 39 | 30 | St 30 | Polycarbonate | 40 | 137 | 45 | 13 |
| Comparative Example 24 | — | — | Polycarbonate | | 135 | 80 | 8.5 |
| Example 40 | 30 | St/An 30 | Polycarbonate | 20, ABS 20 | 130 | 35 | 15 |
| Example 41 | 40 | St/Munh 20 | Nylon 66 | 20, Modified polyolefin 20 | 110 | 17 | 15 |
| Example 42 | 40 | St/Munh 20 | (Meth)acrylic acid ester type-multi-layer polymer | 40 | 109 | 5.0 | 10 |
| Comparative Example 25 | — | — | (Meth)acrylic acid ester type-multi-layer polymer | | 70 | 7.0 | 30 |

Note
St/Munh: styrene/maleic anhydride copolymer-grafted
MMA: methyl methacrylate polymer-grafted
VCl: vinyl chloride polymer-grafted
St/GMA: styrene/glycidyl methacrylate copolymer-grafted
St/An: styrene/acrylonitrile copolymer-grafted
PVCl: polyvinyl chloride composition
PVdF: polyvinylidene fluoride
Modified polyolefin: rubber-reinforced modified polyolefin
*1 measured at 270° C. under 10 kg load
*2 measured at 200° C. under 10 kg load
*3 not flowing As seen from the results shown in Table 9, the resin compositions obtained in Examples 29 through 42 have an excellent combination of heat resistance (HDT), mechanical strength (Izod impact strength), and moldability (flowability), and superior to the resins of Comparative Example 14 through 25.

In the grafted methacrylimide-containing polymer of the present invention, the compatibility or affinity with another thermoplastic polymer can be improved by appropriately selecting an ethylenic monomer to be grafted. A blend of this grafted-methacrylimide-containing polymer and other thermoplastic polymer retains the excellent heat resistance, weatherability, mechanical properties, and moldability inherently possessed by the methacrylimide-containing polymer, and the characteristics of the other polymer are added to the resulting thermoplastic resin composition.

We claim:

1. A methacrylimide-containing polymer produced by graft-polymerizing at least one ethylenic monomer onto a polymer (A) comprised of 5 to 100% by weight of methyacrylimide ring-containing structural units represented by the following Formula (I):

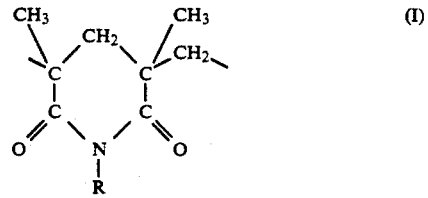

wherein R represents a hydrogen atom or an aliphatic, aromatic or alicyclic hydrocarbon group having 1 to 20 carbon atoms, and 0 to 95% by weight of structural units derived from an ethylenic monomer, wherein the graft polymerization is carried out after said polymer (A) has been reacted with at least one compound having a functional group to form a thermoplastic polymer (B) having grafting active sites therein.

2. A methacrylimide-containing polymer according to claim 1, wherein the grafting active sites comprise a functional group selected from the group consisting of a methallyl group, an allyl group, a methacryloyloxy group, an acryloyloxy group and an epoxy group.

* * * * *